Sept. 7, 1954  J. M. COVINGTON  2,688,520
PRESSURE SEAL FOR ROTATING SHAFTS
Filed Sept. 11, 1950
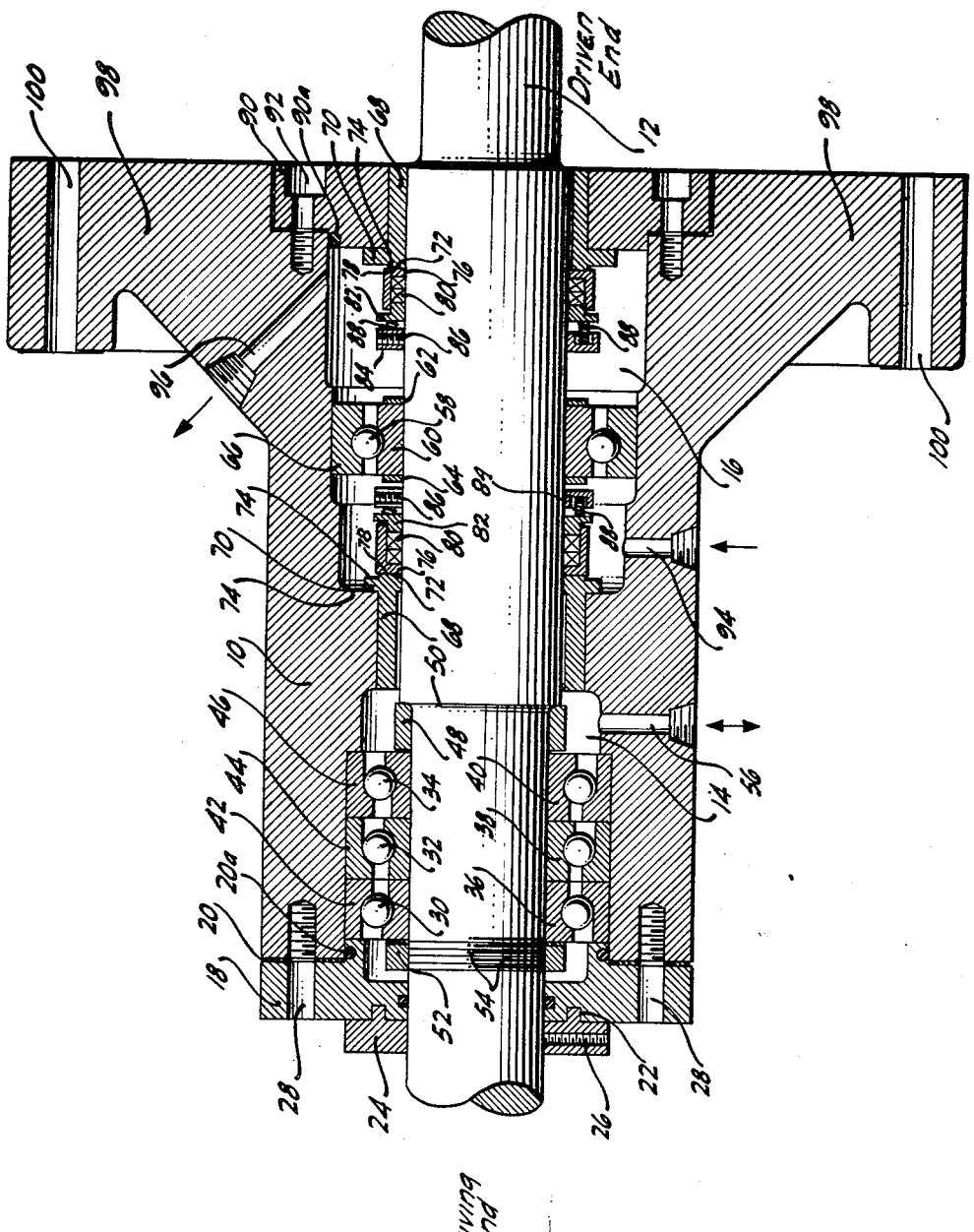
INVENTOR.
JAMES M. COVINGTON,
BY
AGENT.

Patented Sept. 7, 1954

2,688,520

UNITED STATES PATENT OFFICE 2,688,520

PRESSURE SEAL FOR ROTATING SHAFTS

James M. Covington, Long Beach, Calif., assignor to Union Oil Company of California, Los Angeles, Calif., a corporation of California Application September 11, 1950, Serial No. 184,202

6 Claims. (Cl. 308—187.1)

This invention relates to pressure sealed bearings for rotating shafts and particularly relates to an improved radial and thrust bearing combination for a rotating shaft which is provided with a high pressure sealing means to permit the transmission of rotational mechanical energy through a barrier across which a substantial pressure differential is maintained.

The transfer of rotational energy through a barrier separating a high pressure from a low pressure system is of considerable importance in such operations as the agitation of fluids within pressure vessels, the operation of high pressure turbines, high pressure pumps and blowers, and other such operations. The rotating shaft under all conditions must be provided with adequate bearings to maintain the shaft in proper alignment as well as to take up thrust forces frequently involved in such mechanical energy transfer. In many cases the element attached to the driven end of the shaft, that is, the loaded end, operates under high pressure or high temperature or in media which are corrosive or contain abrasive particles or other materials which are highly dangerous to the maintenance of proper bearings along the length of the shaft. Under such conditions a highly effective seal is required to prevent corrosion or abrasion or misalignment of the bearings or other rotating elements due to leakage of high pressure corrosive or abrasive fluids into the shaft seal and bearing housing.

The usual means for sealing and aligning a rotating shaft involves a thrust bearing provided with journal bearings or bushings and one or more packing glands or stuffing boxes to prevent fluid flow along the shaft. Numerous disadvantages are noted with such installations.

One disadvantage is that the use of stuffing boxes as seals causes erosion of the shaft since to prevent the fluid flow therethrough the stuffing box must be tightened up pressing the packing against the shaft and any leakage of abrasive or corrosive fluids into the packing causes serious scoring of the shaft which rotates in sliding contact with the stationary packing. Furthermore the use of journal bearings or bushings prevents the sealing of the bearing over a relatively short length of the shaft, and therefore, the bearing and seal combination is relatively long compared to the shaft diameter. The principal result of this is to give the shaft a relatively low first critical rotational velocity at which shaft flexure occurs causing serious misalignment of the bearings, vibration, and breaking of the seal. Such a sealed shaft therefore is limited to low rotational speeds and is not generally suited to high speed applications such as turbines, blowers, high speed pumps and other such operations.

The present invention, therefore, is directed to a new and improved shaft bearing and seal which is characterized by a high first critical speed and an extended duration of operation without the requirement of packing adjustment or other maintenance requiring discontinuance of service.

It is a primary object of the present invention to provide an improved bearing and seal for rotating shafts transferring rotational mechanical energy.

It is an additional object of the present invention to provide an improved bearing and pressure seal combination for rotational shafts in which a radial bearing for maintaining the shaft in alignment is provided on both sides thereof with a spring loaded mechanical rotating pressure seal.

It is another object of the present invention to provide an improved shaft bearing and seal comprising a combination of a bidirectional thrust bearing and a radial bearing provided with a pair of rotating mechanical spring loaded seals in the absence of packing glands or stuffing boxes which require periodic adjustment.

Other objects and advantages of the present invention will become apparent to those skilled in the art as the description thereof proceeds.

Briefly the present invention comprises an improved apparatus for the transmission of rotational mechanical energy through a high pressure differential in which the normal fluid flow from the high pressure to low pressure region along the shaft and vibration and periodic maintenance are virtually eliminated. This result is accomplished by providing a shaft housing surrounding the rotating shaft coaxially thereby providing an annular space between the shaft and the housing for the various bearings and seals. Toward the driving end of the shaft, the end to which the prime mover is attached, a bidirectional thrust bearing is provided receiving thrust forces from the shaft to prevent longitudinal movement thereof during operation. Within a second annular compartment of the shaft housing toward the driven or load end of the shaft is provided a radial or annular alignment bearing maintained between a pair of rotating mechanical spring loaded seals. In each of these seals a rotating member secured to the shaft is provided with a surface which is lapped into flat contact with a stationary surface secured to the housing to form the seal. The rotating surface of the seal is spring loaded in a direction longitudinal with the shaft axis to maintain the seal surfaces under a compressive force holding them together. By so sealing the alignment bearing considerably less shaft length is required to pass through the seals and thus a considerable increase in the first critical velocity of the shaft is obtained.

The thrust bearing chamber is lubricated by maintaining a level of lubricant in the chamber which submerges the lower portion of the thrust bearings surrounding the shaft, that is, the level is maintained near the lower surface of the shaft. The axial bearing is lubricated by passing a fluid lubricant under pressure through the radial bearing housing and maintaining it full of lubricant under a pressure substantially the same as that on the high pressure side of the barrier through which mechanical energy is to be transferred.

The construction and operation of the apparatus of the present invention will be more clearly understood by reference to the following discussion and to the accompanying drawing which shows an elevation view of the shaft bearing and seal combination of the present invention in cross section.

Referring now more particularly to the drawing, the apparatus of the present invention comprises shaft housing 10 through which rotational shaft 12 extends. Two principal annular chambers are machined within housing 10 and surrounding shaft 12 which include thrust bearing chamber 14 and radial bearing and seal chamber 16. In the modification shown the left-hand end of the shaft is the driving end while the right-hand end is the driven or loaded end. Shaft housing 10 is provided with driving end closure 18 which is bolted to shaft housing 10 and provided with gasket 20 or O ring seal 20a. A milled groove 22 is provided on the outside surface of closure 18 concentric to shaft 12. A labyrinth dust seal 24 attached to shaft 12 by means of set screw 26 rotates with the shaft and is provided with a member rotating in groove 22. Closure 18 is secured to housing 10 by means of bolts placed in bolt holes 28.

Thrust bearing chamber 14 contains a bidirectional thrust bearing by means of which longitudinal thrust forces in either direction are transmitted from the shaft through the thrust bearing into the housing. Radial thrust bearings of the roller or ball-bearing type may be employed, but the ball-bearing type is preferred. In the drawing three individual ball-type monodirectional thrust bearings are shown with first bearing 30 adapted to take up a thrust in the right-hand direction (from the driving to the driven end) and second and third bearings 32 and 34 of the set are adapted to resist thrust forces acting in the left-hand direction (from the driven to the driving end of the shaft). A single bidirectional radial thrust bearing may be substituted for the three units shown. Inner bearing races 36, 38 and 40 of these bearings are secured to the rotating shaft while outer races 42, 44 and 46 are held against the inner surface of thrust bearing chamber 14. Thrust collar 48 is provided surrounding shaft 14 between inner race 40 and shaft shoulder 50 whereby thrust forces are transmitted from the shaft into the thrust bearing set. The inner races 36, 38 and 40 are held against shaft shoulder 50 by means of thrust bearing lock nut 52 tightened on threaded portion 54 of the shaft.

In this manner thrust bearings 30, 32 and 34 are securely held within thrust bearing chamber 14 on shaft 12. The clearances between the inner wall of chamber 14 and shaft 12 are close permitting a fine fit between the shaft and the inner races, and between the outer races and the chamber surface.

Usually the driving end of the shaft is the low pressure end so that the lubrication of the thrust bearing is relatively simple. Lubricant inlet or outlet 56 is provided whereby a lubricant level is maintained within thrust bearing chamber 14 by means of a goose neck level controller or other such simple apparatus not shown. The thrust bearing chamber need not be maintained full of lubricant and a level sufficient to fill bearing chamber 14 up to the bottom of the rotating shaft is sufficient. As will subsequently be described there may be a slight lubricant flow along the shaft into thrust bearing chamber 14 from radial bearing chamber 16 and under such conditions a slow draw off of lubricant from opening 56 controlled by a level controller not shown is required.

Referring now particularly to radial bearing chamber 16, radial bearing 58 is shown with inner race 60 secured to shaft 12 and maintained in fixed position by means of a pair of bearing race retainer rings 62 and 64. Both shaft 12 and radial bearing chamber 16 are machined to close tolerances so that a light press fit between the shaft and the bearing and between the bearing and the inner walls of the bearing chambers exists.

Positioned on both sides of radial bearing 58 are two rotating mechanical spring loaded seals whereby the high pressure fluids into which the driven end of the shaft extends are prevented from flowing into radial bearing chamber 16 and the high pressure lubricant maintained within chamber 16 is prevented from flowing along the shaft into thrust bearing chamber 14. Two similar seals are employed and will be described simultaneously.

These rotating seals consist of five principal parts including a stationary soft metal sleeve and a rotating seal collar, packing, packing collar and packing collar retainer ring. The last four elements rotate with the shaft. A stationary soft metal cylinder 68 provided with flange 70 and wearing shoulder 72 is provided which is secured within housing 10 and provided with a clearance between itself and rotating shaft 12. Cylinder 68 is secured under spring pressure as subsequently described in a press fit to housing 10 whereby flange 70 bears against projection 74 which marks a division between thrust bearing chamber 14 and radial bearing chamber 16. An O ring seal (not shown) may be provided between shaft 12 and cylinder 68 as an additional precaution against flow of lubricant along the shaft. Shoulder 72 provides a soft metal wearing surface for the mechanical seal. Cylinder 68 is preferably fabricated from such materials as leaded bronze, graphite, or other such materials, leaded bronze being preferred since it is self lubricating and is found to stand up well under long periods of heavy duty operation. The soft metal wearing surface is in this modification a radial surface 74 of shoulder 72 but conical, convex or concave wearing surfaces may be employed.

The rotating part of the mechanical seal comprises seal collar 76 having a hard metal wearing surface 78 in rotational contact with soft metal wearing surface 74. The two contacting surfaces are lapped into uniform contact and form the mechanical seal referred to above. Seal collar 76 is of L-shaped cross section providing an annular space for packing 80. The hard wearing surface of the seal collar is preferably such material as Stellite which is a nonferrous alloy of cobalt, tungsten, and chromium. However, other hardened materials may be substituted.

Packing 80 is maintained in a compressed condition within the annular space provided between L-shaped seal collar 76 and L-shaped spring loaded packing collar 82. Packing collar retainer ring 84 is secured by means of set screw 86 to rotating shaft 12. Between packing collar 82 and packing collar retaining ring 84 are positioned at a plurality of points a series of compression springs 88 by means of which packing collar 82 and its shoulder, fitting into the annular space referred to, compress packing 80 tightly against shaft 12. Seal collar 76, packing 80, packing collar 82 and the retaining ring 86 all rotate with shaft 82 and the pressure seal is provided by the rotating contact of lapped surfaces 74 and 78. Loading springs 88 in addition to maintaining packing 80 in a compressed condition also compress seal collar 76 against shoulder 72 of soft metal cylinder 68 and keep the seal surfaces 74 and 78 in close contact.

Since two similar rotating mechanical seals are provided, one on each side of radial bearing 58 along shaft 12, they have been described above together and similar parts in each seal are designated by the same numbers.

Driven end closure 90 is provided whereby, by means of bolts passed into bolt holes 92, the shaft and associated seals and bearing are enclosed into housing 10. An O ring seal 90a may be provided to prevent lubricant leakage.

The lubrication of radial bearing 58 is preferably effected by introducing the lubricant under pressure via opening 94 under substantially the same pressure as exists around the driven end of shaft 12. Lubricant outlet 96 is provided at a point substantially 180° around shaft 12 and at the opposite end of chamber 16 from lubricant inlet 94. Preferably outlet 96 opens from chamber 16 so that the lubricant entirely fills the chamber. This lubricant is continuously circulated through radial bearing chamber 16 and through means not shown for cooling and filtering the circulating lubricant stream. Thus, means for continuously cooling and lubricating the radial bearing are provided.

The pressure differential existing across driven end sealed surfaces 74 and 78 (right-hand seal on the drawing) may be substantially zero by virtue of the fact that pressure of the lubricant is maintained substantially the same as that of the high pressure system into which the driven end of shaft 12 extends. Whether or not the lubricant pressure in chamber 16 is maintained slightly above or slightly below the system pressure into which mechanical energy is to be transferred depends principally upon the nature of the fluids maintained in the high pressure system. For example, when this seal is employed to rotate a blower maintained in a high pressure case and employed to recirculate a gas containing finely divided solids, the pressure of the lubricant is preferably maintained slightly in excess of the discharge pressure of the blower. Under these conditions any slight leakage through the driven end shaft seal will be a leakage of lubricant out of radial bearing chamber 16. This is preferable since small quantities of lubricant, if leakage occurs, are less troublesome than a slight leakage of high pressure gas and abrasive solids into the bearing. Under some conditions of operation it is conceivable that the introduction of lubricant into the high pressure system would be far more serious than the slight leakage of noncorrosive and nonabrasive high pressure fluids into the bearing. In such an instance it is preferable that the radial bearing lubricant pressure be maintained slightly below that of the high pressure system into which the shaft extends. In any event it is desirable to maintain a pressure differential across the driven end seal which is substantially zero.

Housing 10 may be provided with inspection ports not shown whereby adjustments of the position of packing collar retainer rings 84 may be made. With a soft metal wearing surface comprising leaded bronze and a hard metal seal collar provided with a Stellite alloy wearing face substantially continuous operations without need for adjustment have been effected for periods of over one year. Consequently inspection ports are not essential and any adjustments which are sometimes required may be conveniently made during shut downs of the high pressure equipment associated with the mechanical bearing and seal.

A preferred type of packing material comprises polyfluoroethylene plastic materials which are very resilient, acid and heat resistant, inert in the presence of most lubricants and are tough. Such packing materials have been found to hold up extremely well under the conditions of operation herein described.

In the drawing, housing 10 is shown provided with flange 98 together with bolt holes 100. Flange 98 may be employed to attach the bearing and seal housing to the wall of a high pressure vessel by means of bolts and a gasket not shown but conventional in high pressure equipment design. In certain more permanent types of equipment, bolt holes 100 may be eliminated and flange 98 may be welded permanently into position and become part of the high pressure barrier through which mechanical energy is to be transferred.

*Example I*

A bearing shaft and seal assembly according to the present invention adapted to transmit 100 horsepower from an electric motor driven to a high pressure blower employs a shaft having a diameter of 3.3469 inches at the driven end and 2.9523 inches at the point where the bidirectional thrust bearings are situated. The inside diameter of the thrust bearing chamber is 6.3005 inches and 5.825 inches in length. The thrust bearing consists of a set of three ball-type thrust bearings associated together so that two bearings of the set resist thrust toward the driving end of the shaft and one resists thrust toward the driven end of the shaft. The inside diameter of the radial bearing chamber is 7.0868 inches. The over-all length of the bearing seal housing unit is 18.5 inches measured from the outside surfaces of both closures with the radial bearing centered about 5 inches and the thrust bearing centered about 14.5 inches from the driven or load end of the shaft.

*Example II*

The pilot plant bearing and seal assembly according to the present invention is employed to rotate a blower generating a one pound pressure differential but operating at an absolute pressure of 800 pounds. It is designed to operate at 3600

R. P. M. from an electric motor drive to recirculate a gas containing suspended charcoal fines. The shaft diameter is 1.50 inches. Because of the high operating pressure the thrust on the shaft is from the driven end toward the driving end. The horsepower transmitted is approximately 10 and trouble-free operation for over one year has been experienced without abrasive or vibrational problems. In experimental operation of the seal and bearing assembly, rotary velocities as high as 5,000 R. P. M. and higher do not show any decrease in the desirability of operation.

The desirability of employing a bidirectional thrust bearing is particularly pronounced in cases where the load on the shaft is an impeller operated at high pressure. In the case of a blower the absolute pressure acting on the shaft cross section exerts a thrust toward the driving end of the shaft; whereas, the differential pressure generated by the impeller may act in the opposite direction across the cross sectional area of the impeller. Depending upon the absolute values of operating pressure and shaft and impeller cross sectional area the net thrust during operation may be either toward the driven end or toward the driving end of the shaft and may change during start-up and shut down of the equipment.

*Example III*

In an installation involving a 69 horsepower blower operating at an absolute pressure of 105 pounds per square inch and with a differential pressure from inlet to outlet of 4.0 pounds per square inch, the shaft has a diameter of 2.5 inches and the impeller has a diameter of 40 inches. The absolute pressure of gases in the blower acting against the cross sectional area of the driving shaft is insufficient to balance the integrated impeller area-pressure differential acting in the opposite direction. Consequently the net thrust force is from the driving end toward the driven end of the shaft.

*Example IV*

In another case in which the bearing and seal are employed to operate a 10 horsepower blower, the shaft diameter is 1.25 inches, the impeller diameter is 20 inches, the absolute blower pressure is 800 pounds per square inch and the blower pressure differential is 1.0 pound per square inch. Under such conditions it is found that the absolute pressure acting against the cross sectional area of the blower shaft exceeds the force acting in the opposite direction due to the integrated differential pressure of the blower acting against the cross sectional area of the impeller. Thus the net thrust force along the shaft is from the driven end of the shaft toward the driving end.

It is also to be noted that in cases where the driven member is a blower which operates under a variable absolute pressure or a propeller type impeller as in an agitator and provided with a reversible drive, changes in direction of the net thrust force are to be expected. The bidirectional thrust bearing of the present invention performs well in such applications while the seal and radial alignment bearing prevents the leakage of fluids from the high pressure regions into the alignment bearings.

The combination of the bidirectional thrust bearing and the radial bearing provided with a pair of mechanical spring loaded rotating seals, one on either side of the radial bearing, results in an unusually stable and versatile combination for use in applications where the operating conditions on the seals and the thrust bearing are unusually severe.

A particular embodiment of the present invention has beeen hereinabove described in considerable detail by way of illustration. It should be understood that various other modifications and adaptations thereof may be made by those skilled in this particular art without departing from the spirit and scope of this invention as set forth in the appended claims.

I claim:

1. A sealed bearing for rotating shafts which comprises a rotating shaft, a cylindrical housing surrounding said shaft and providing therebetween an annular thrust bearing chamber and an annular radial bearing chamber, a radial shaft bearing positioned in said annular space at an intermediate point between the ends thereof, a lubricant inlet opening into the bottom and a lubricant outlet opening from the top of said annular chamber, means for circulating said lubricant upwardly therethrough under pressure thereby submerging said radial bearing completely in a body of said lubricant, a rotating mechanical spring loaded seal positioned on each side of said radial bearing and secured to said rotating shaft, said rotating seal comprising a packing collar retainer ring surrounding said shaft adjacent said radial bearing, a packing collar slidably mounted on said shaft adjacent said retainer ring, a plurality of compression springs longitudinally mounted between said retainer ring and said packing collar, an L shaped seal collar slidably mounted on said shaft engageable with said packing collar, a shaft packing surrounding said shaft and enclosed by the engagement of said packing collar and said seal collar, said seal collar presenting a hardened lapped wearing surface against a soft lapped nonrotating wearing surface secured to housing, a thrust bearing surrounding said shaft and enclosed within said thrust bearing chamber, and inlet means into said thrust bearing chamber to maintain a lubricant therein.

2. A sealed bearing for rotating shafts which comprises a rotating shaft, a cylindrical housing surrounding said shaft and providing therebetween an annular thrust bearing chamber and an annular radial bearing chamber, a radial shaft bearing positioned in said annular space at an intermediate point between the ends thereof, a lubricant inlet opening into the bottom and a lubricant outlet opening from the top of said annular chamber, means for circulating said lubricant upwardly therethrough under pressure thereby submerging said radial bearing completely in a body of said lubricant, a rotating mechanical spring loaded seal positioned on each side of said radial bearing and secured to said rotating shaft, said rotating seal comprising a packing collar retainer ring surrounding said shaft adjacent said radial bearing, a packing collar slidably mounted on said shaft adjacent said retainer ring, a plurality of compression springs longitudinally mounted between said retainer ring and said packing collar, an L shaped seal collar slidably mounted on said shaft engageable with said packing collar, a shaft packing surrounding said shaft and enclosed by the engagement of said packing collar and said seal collar, said seal collar presenting a hardened lapped wearing surface against a soft lapped nonrotating wearing surface secured to housing, a bidirectional thrust bearing surrounding said shaft and enclosed within said thrust bearing chamber, a thrust collar surrounding said shaft in said thrust bearing chamber and engageable with a shoulder on said shaft, a thrust bearing lock nut threaded upon said shaft for securing said thrust bearing against said thrust collar, and inlet means into said thrust bearing chamber to maintain a lubricant therein.

3. A high pressure sealed bearing for rotating shafts which comprises in combination a rotating shaft, a housing enclosing a portion of said shaft, a driving end and a driven end closure surrounding said shaft and secured to opposite ends of said housing, said housing providing an annular thrust bearing chamber and an annular radial bearing chamber between said housing and said shaft, a radial bearing positioned within said radial bearing chamber, an inlet conduit opening into the lower part and an outlet conduit opening from the upper part of said radial bearing chamber for a recirculating stream of lubricant upwardly therethrough under pressure and thereby completely submerge said radial bearing therewith, a pair of rotating mechanical spring loaded pressure seals secured to said shaft, one each of said seals being positioned within said radial bearing chamber on opposite sides of the bearing positioned therein, a lubricant filtration means, a lubricant cooling means, means for circulating lubricant under pressure by means of said inlet and outlet conduits through said filtration means and said cooling means and through said radial bearing chamber, a bidirectional thrust bearing positioned within said thrust bearing chamber, said thrust bearing being secured to said shaft passing therethrough by means of a threaded thrust bearing lock nut, and means for maintaining a volume of lubricant in said thrust bearing chamber.

4. An apparatus according to claim 3 in combination with a rotating labyrinth dust seal secured to said rotating shaft and engageable with said closure at the driving end of said housing.

5. An apparatus according to claim 3 wherein said thrust bearing is secured to said rotating shaft by means of a thrust bearing lock nut threaded to said shaft and tightened against the inner rotating race of said thrust bearing and against a shoulder milled in said rotating shaft.

6. An apparatus according to claim 3 wherein said mechanical spring loaded rotating seals comprise a packing collar retainer ring secured to said rotating shaft immediately adjacent said radial bearing, an L shaped spring loaded packing collar slidably mounted on said rotating shaft and positioned immediately adjacent said retainer ring, compression springs positioned between said retainer ring and said packing collar, a shaft packing surrounding said rotating shaft immediately adjacent said packing collar, a rotating L shaped seal collar slidably mounted on said rotating shaft and engageable with said packing collar and enclosing said shaft packing in the space therebetween, said seal collar provided with a lapped radial wearing surface of abrasion resistant material, a soft metal cylinder secured to said housing provided with a shoulder and a wearing surface faced against the hard wearing surface of said seal collar to provide a seal therebetween.

References Cited in the file of this patent

UNITED STATES PATENTS

| Number | Name | Date |
|---|---|---|
| 1,396,327 | Haeberlein | Nov. 8, 1921 |
| 1,755,440 | Gross | Apr. 22, 1930 |
| 1,835,877 | Joyce | Dec. 8, 1931 |
| 2,388,570 | Philips et al. | Nov. 6, 1945 |
| 2,390,977 | Williams | Dec. 11, 1945 |
| 2,423,436 | Bloom | July 8, 1947 |
| 2,481,430 | Koller | Sept. 6, 1949 |